United States Patent
Tanaka (10) Patent No.: US 9,409,445 B2
(45) Date of Patent: Aug. 9, 2016

(54) HEAVY DUTY PNEUMATIC TIRE

(71) Applicant: SUMITOMO RUBBER INDUSTRIES, LTD., Kobe-shi, Hyogo (JP)

(72) Inventor: Satoshi Tanaka, Kobe (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 249 days.

(21) Appl. No.: 13/654,628

(22) Filed: Oct. 18, 2012

(65) Prior Publication Data

US 2013/0105052 A1     May 2, 2013

(30) Foreign Application Priority Data

Oct. 26, 2011    (JP) ................. 2011-235279

(51) Int. Cl.
     *B60C 11/03*      (2006.01)
     *B60C 11/11*      (2006.01)
     *B60C 11/12*      (2006.01)
     *B60C 11/117*     (2006.01)

(52) U.S. Cl.
CPC ......... *B60C 11/032* (2013.04); *B60C 11/0306* (2013.04); *B60C 2011/0344* (2013.04); *B60C 2011/0346* (2013.04); *B60C 2011/0348* (2013.04); *B60C 2200/06* (2013.04)

(58) Field of Classification Search
CPC .................. B60C 11/117; B60C 11/032
USPC ...................................... 152/209.17
See application file for complete search history.

(56) References Cited

U.S. PATENT DOCUMENTS

| | | | | |
|---|---|---|---|---|
| 5,385,189 A * | 1/1995 | Aoki et al. | ............... | 152/209.21 |
| 2002/0036039 A1* | 3/2002 | Shimura | .................... | 152/154.2 |
| 2006/0213594 A1* | 9/2006 | Kemp et al. | ................ | 152/154.2 |
| 2013/0186533 A1* | 7/2013 | Kaneko | ................ | B60C 11/032 |
| | | | | 152/209.17 |

FOREIGN PATENT DOCUMENTS

| | | | | |
|---|---|---|---|---|
| GB | 546975 A * | 8/1942 | .......... | B60C 11/0306 |
| JP | 04085108 A * | 3/1992 | .............. | B60C 11/11 |
| JP | 05077613 A * | 3/1993 | .............. | B60C 11/12 |

(Continued)

OTHER PUBLICATIONS

Machine Translation: JP 2006168498 A; Ochi, Naoya; no date.*

(Continued)

*Primary Examiner* — Steven D Maki
*Assistant Examiner* — Kendra Ly
(74) *Attorney, Agent, or Firm* — Birch, Stewart, Kolasch & Birch, LLP (57) ABSTRACT

A heavy duty pneumatic tire includes main grooves that extend in the tire circumferential direction. A siped block is provided with at least one sipe to circumferentially subdivide the block into at least two block pieces that include at least one holed block piece provided with at least one small hole. Each small hole extends radially inwardly from the ground contacting surface of the holed block piece to its bottom at a depth in a range of from 30 to 100% of a depth of the main grooves. Each small hole has a round cross-sectional shape to have a maximum radius in a range of from 0.6 to 2.0 mm at the opening of the small hole in the ground contacting top surface. The total opening area of the at least one small hole is 2 to 12% of the overall area of the ground contacting top surface.

11 Claims, 8 Drawing Sheets

(56) References Cited

FOREIGN PATENT DOCUMENTS

| | | | | |
|---|---|---|---|---|
| JP | 10272905 A | * | 10/1998 | ............ B60C 11/117 |
| JP | 2006007797 A | * | 1/2006 | |
| JP | 2006-168498 A | | 6/2006 | |
| JP | 2006168498 A | * | 6/2006 | .............. B60C 11/12 |
| JP | 2007331409 A | * | 12/2007 | |
| JP | 2009-190677 A | | 8/2009 | |
| JP | 2009274726 A | * | 11/2009 | ............ B60C 11/117 |
| JP | WO 2012029125 A1 | * | 3/2012 | ............ B60C 11/032 |

OTHER PUBLICATIONS

Machine Translation: JP 05077613 A; Ataka et al.; no date.*
Machine Translation: JP 10272905 A; Ishikawa, Junichi; no date.*
Machine Translation: JP 2009274726 A; Watabe et al.; no date.*
Machine Translation: JP 2007331409 A; Ochi, Naoya; no date.*
Machine Translation: JP 2006007797 A; Ochi, Naoya; no date.*

* cited by examiner

HEAVY DUTY PNEUMATIC TIRE

BACKGROUND OF THE INVENTION

The present invention relates to a heavy duty pneumatic tire, more particularly to a tread pattern comprising blocks provided with sipes and small holes capable of improving on-ice performance without sacrificing uneven wear resistance and durability.

In Japanese Patent Application Publication No. 2009-190677, a studless tire improved in the running performance on icy roads having low friction coefficients is disclosed. In this kind of a tire, blocks formed in the tread portion are provided with sipes. Owing to the sipes, the blocks can deform flexibly and scratch a road surface by their edges to improve driving force and braking force on the icy road.

Japanese Patent Application Publication Nos. 2009-190677 and 2006-168498 disclose passenger car tires, in which blocks in the tread portion are provided with small holes instead of sipes thereby to satisfy both of block rigidity and on-ice performance.

If the technique disclosed in Japanese Patent Application Publication No. 2006-168498 is applied to a heavy duty pneumatic tire used under high internal pressure and heavy loads, blocks suffer from uneven wear and tearing off in an early stage, therefore, it is difficult to provide sufficient durability.

SUMMARY OF THE INVENTION

It is therefore, an object of the present invention to provide a heavy duty pneumatic tire which can be improved in the on-ice performance without scarifying uneven wear resistance and durability.

According to the present invention, a heavy duty pneumatic tire comprises a tread portion provided with a plurality of blocks divided by a plurality of main grooves and a plurality of lateral grooves, the main grooves extending in the tire circumferential direction and each having a width in a range of from 5 to 13 mm, the blocks including a siped block provided with at least one sipe extending axially across the entire width thereof to circumferentially subdivide the block into at least two block pieces, wherein the at least two block pieces include at least one holed block piece provided with at least one small hole, each of the small holes extending radially inwardly from a ground contacting top surface of the holed block piece to its bottom at a depth in a range of from 30 to 100% of a depth of the main grooves, each of the small holes having a round cross-sectional shape to have a maximum radius in a range of from 0.6 to 2.0 mm at the opening of the small hole in the ground contacting top surface, and the total opening area of the at least one small hole is in a range of from 2 to 12% of the overall area of the ground contacting top surface.

The heavy duty pneumatic tire according to the present invention may be further provided with the following features:

a minimum thickness of rubber surrounding each of the small holes occurring when measured normally to the edge of the opening of the small hole in the ground contacting top surface is in a range of from 3 to 6 mm;

the small hole has a cross-sectional area gradually increasing from the bottom towards the ground contacting top surface;

the small hole has an elliptical cross-sectional shape of which major axis extends in the tire circumferential direction, and the length of the major axis is gradually increased from the bottom towards the ground contacting top surface;

the small hole has a cross-sectional shape which is a circular shape at the bottom and, at the ground contacting top surface, an elliptical shape of which major axis extends in the tire circumferential direction; and the at least two block pieces are three block pieces which are a pair of outside block pieces and one inside block piece therebetween, and each of the outside block pieces is provided with a plurality of the small holes arranged in the tire axial direction.

Therefore, the small holes soak a water film on a road surface and scratch the road surface by their edges to obtain a friction force and improve on-ice performance. Further, the small holes allow for the holed block pieces to maintain rigidity required for a heavy duty pneumatic tire used under high pressure and heavy loads, therefore, uneven wear resistance and durability can be maintained.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

The tread edges are the axial outermost edges of the ground contacting patch (camber angle=0) in the normally inflated loaded condition.

The tread width is the axial distance between the tread edges measured in the normally inflated unloaded condition of the tire.

DESCRIPTION OF THE PREFERRED EMBODIMENTS

Embodiments of the present invention will be described below with reference to the accompanying drawings.

According to the present invention, a heavy duty pneumatic tire 1 is designed as a studless tire and compresses a tread portion 2, a pair of axially spaced bead portions each with a bead core therein, a pair of sidewall portions extending between the tread edges 2e and the bead portions, a carcass extending between the bead portions, and a tread reinforcing belt disposed radially outside the carcass in the tread portion as usual.

The tread portion 2 is provided with a plurality of blocks 5 divided by a plurality of main grooves 3 extending in a tire circumferential direction and a plurality of lateral grooves 4 extending in a direction crossing the main grooves 3.

Figure 1:
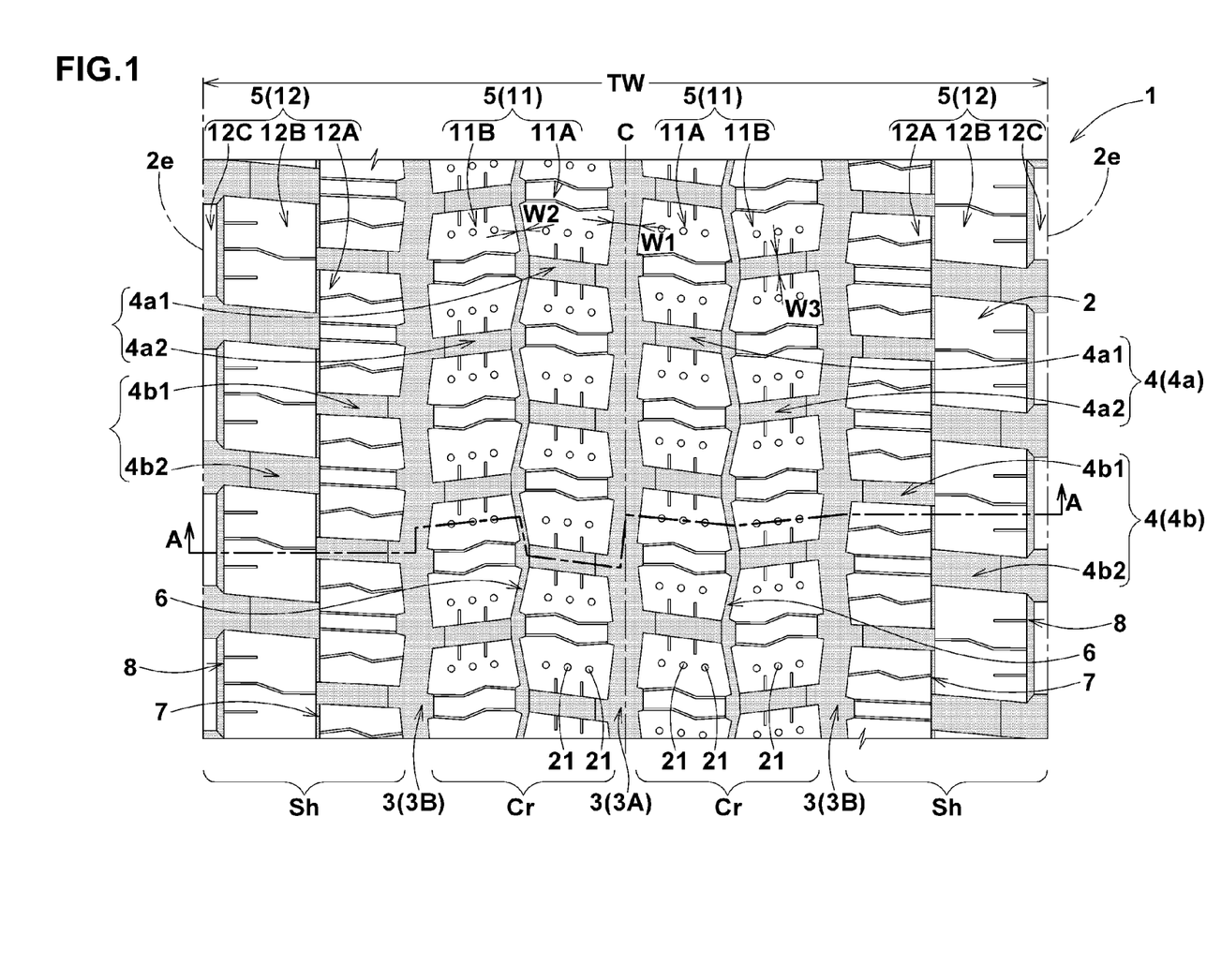
FIG. 1 is a developed partial plan view of a heavy duty pneumatic tire as an embodiment of the present invention showing a tread pattern.
Figure 2:
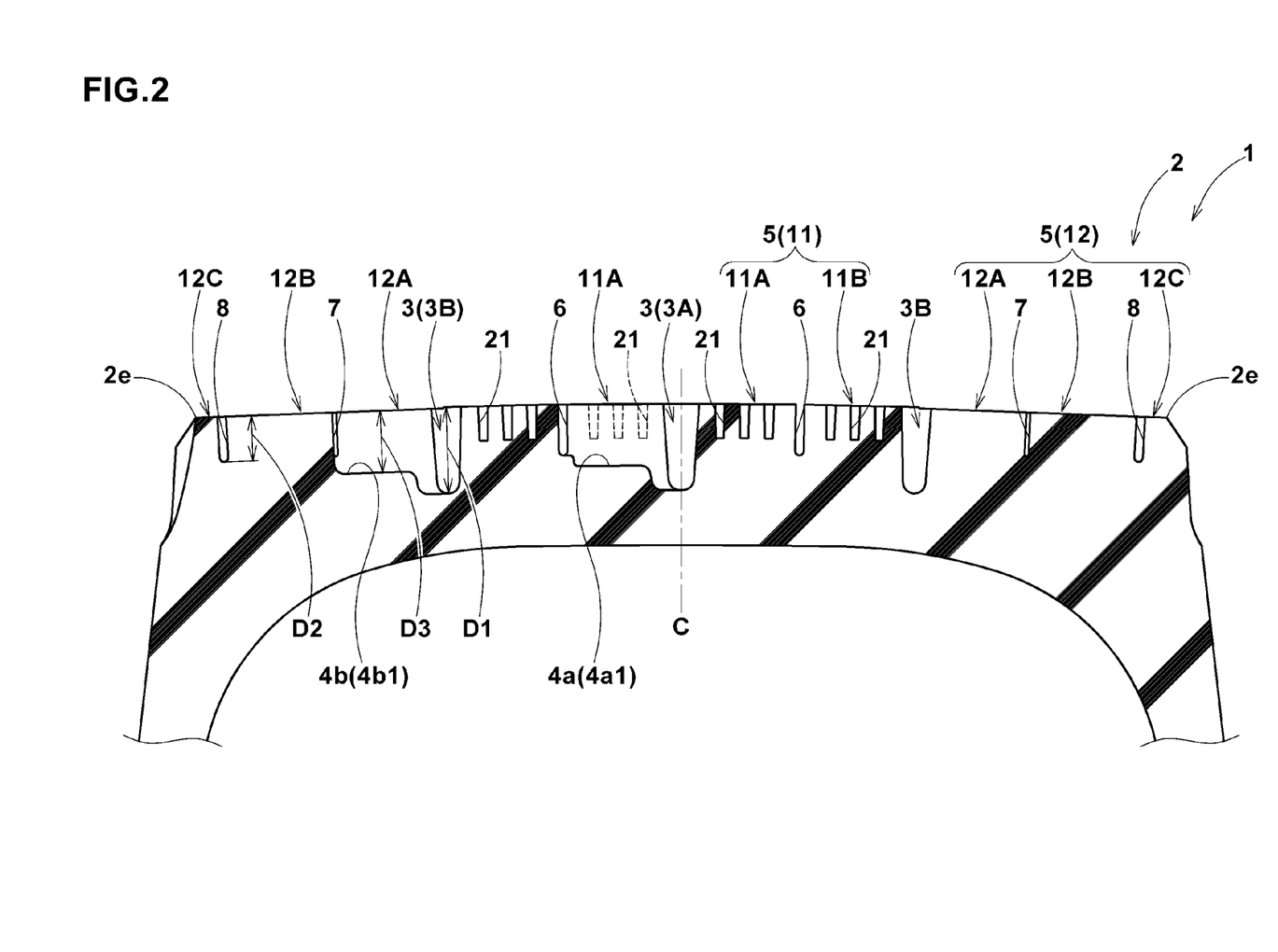
FIG. 2 is a cross-sectional view of the tread portion thereof taken along line A-A in FIG. 1.

For example, as shown in FIG. 1, the main grooves 3 include one center main groove 3A extending along the tire equator c and a pair of shoulder main grooves 3B disposed one on each side of the center main groove 3A. Accordingly, the tread portion 2 is divided into a pair of crown land portions Cr between the center main groove 3A and the shoulder main grooves 3B, and a pair of shoulder land portions sh between the shoulder main grooves 3B and tread edges 2e.

Each of the center main groove 3A and the shoulder main grooves 3B extends continuously in the tire circumferential direction in a zigzag manner with a small zigzag amplitude. The center main groove 3A and the shoulder main grooves 3B can smoothly guide a water film on a road surface, and exert edge effect in the tire circumferential direction, to thereby improve drainage performance, snow self-ejecting performance, and on-ice performance.

Preferably, the main grooves 3A and 3B each have a groove width W1 of about 2 to 7% of the tread width TW and a groove depth D1 of about 5 to 11% of the tread width TW.

The tread portion 2 is further provided with sub-grooves which are narrower than the main grooves 3 and extend continuously in the tire circumferential direction.

On each side of the tire equator c, the sub-grooves include a middle sub-groove 6 extending in a zigzag manner at an almost intermediate position between the center main groove 3A and the shoulder main grooves 3B, an inside shoulder sub-groove 7 extending straight on the tire equator C sides of the intermediate position between the shoulder main groove 3B and the tread edge 2e, and an outside shoulder sub-groove 8 extending straight on the tread edge side of the inside shoulder sub-groove 7.

Preferably, the sub-grooves 6, 7 and 8 each have a groove width W2 of about 0.5 to 1.5% of the tread width TW and a groove depth D2 of about 2 to 7% of the tread width TW. The middle sub-grooves 6, the inside shoulder sub-grooves 7, and the outside shoulder sub-grooves 8 improve wet performance and on-ice performance.

The lateral grooves 4 include
crown lateral grooves 4a between the center main groove 3A and the shoulder main grooves 3B, and
shoulder lateral grooves 4b between the shoulder main grooves 3B and the tread edges 2e.

Preferably, the lateral grooves 4a and 4b each have a groove width W3 of about 2 to 5% of the tread width TW and a groove depth D3 of about 2 to 5% of the tread width TW.

Thus, the crown lateral grooves 4a and the shoulder lateral grooves 4b smoothly guide a water film on a road surface to improve drainage performance, and provide a snow shearing force to improve on-snow performance.

The crown lateral grooves 4a include
axially inside crown lateral grooves 4a1 extending between the center main groove 3A and the middle sub-grooves 6, and axially outside crown lateral grooves 4a2 extending between the middle sub-grooves 6 and the shoulder main grooves 3B.

The crown lateral grooves 4a1 and 4a2 are inclined at angles of 5 to 15 degrees with respect to the tire axial direction.

The inside and outside crown lateral grooves 4a1 and 4a2 are arranged alternately in the tire circumferential direction (more specifically arranged staggeredly along the middle sub-groove 6) and are inclined with respect to the axial direction toward the opposite directions. The inside and outside crown lateral grooves 4a1 and 4a2 can exert edge effect in the tire circumferential direction and the tire axial direction, thereby to improve on-ice performance.

The shoulder lateral grooves 4b include
axially inside shoulder lateral grooves 4b1 extending between the shoulder main grooves 3B and the inside shoulder sub-grooves 7, and
axially outside shoulder lateral grooves 4b2 extending between the inside shoulder sub-grooves 7 and the tread edges 2e.

The inside and outside shoulder lateral grooves 4b1 and 4b2 are arranged alternately in the tire circumferential direction (more specifically arranged staggeredly along the inside shoulder sub-groove 7), and are inclined with respect to the tire axial direction at a small angle of about 0 to 10 degrees. The inside and outside shoulder lateral grooves 4b1 and 4b2 are also useful for improvement of on-ice performance.

The blocks 5 include crown blocks 11 formed in the crown land portions Cr and shoulder blocks 12 formed in the shoulder land portions Sh.

On each side of the tire equator c, the crown blocks 11 include axially inside crown blocks 11A divided by the inside crown lateral groove 4a1, the center main groove 3A and the middle sub-groove 6, and
axially outside crown blocks 11B divided by the outside crown lateral grooves 4a2, the middle sub-groove 6 and the shoulder main groove 3B.

Figure 3:
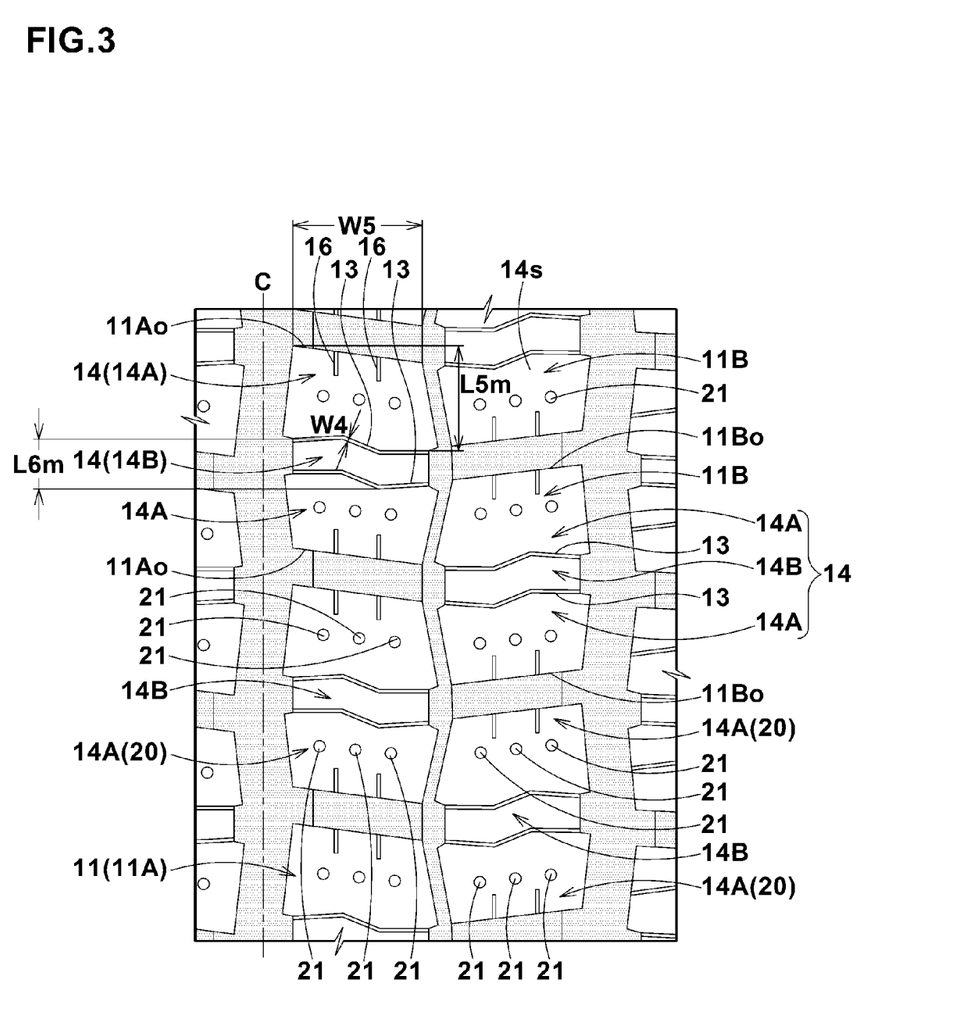
FIG. 3 is an enlarged top view of a crown block of the tire shown in FIG. 1.

As shown in FIG. 3, each of the inside crown blocks 11A and the outside crown blocks 11B is provided with at least one sipe 13 (in this example two sipes 13) extending across the entire axial width of the block concerned to subdivide into at least two (in this example three) block pieces 14.

The sipe 13 extends in a zigzag manner in the tire axial direction.

The sipes 13 allow the inside and outside crown blocks 11A and 11B to deform flexibly, and exert edge effect in the tire circumferential direction and the tire axial direction, thereby to improve on-ice performance.

Preferably, the sipes 13 have a width W4 (perpendicular to the longitudinal direction of the sipe) of about 0.5 to 1.0 mm and a depth of about 35 to 65% of the groove depth D1 of the main grooves 3A and 3B.

In this example, the block pieces 14 include a pair of outside block pieces 14A disposed on both sides in the tire circumferential direction CD, and one inside block piece 14B sandwiched between the outside block pieces 14A.

The outside block pieces 14A are each formed in an approximately trapezoidal shape such that an axial width W5 thereof gradually increases from the circumferential end 11Ao/11Bo of the inside/outside crown block 11A/11B toward the inside block piece 14B.

The outside block pieces 14A each have a circumferential maximum length L5m larger than a circumferential maximum length L6m of the inside block piece 14B.
Accordingly, the rigidity of the inside/outside crown block 11A/11B becomes relatively large in the outside block pieces 14A to thereby suppress occurrence of uneven wear such as heel-and-toe wear.

Preferably, the maximum length L5m of the outside block pieces 14A is about 200 to 280% of the maximum length L6m of the inside block piece 14B.

Each of the outside block pieces 14A is provided with at least one longitudinal sipe 16 (in this example two sipes 16) each extending in the tire circumferential direction from the outer edge 11Ao/11Bo of the inside/outside crown block 11A/11B toward the outer edge 11Ao/11Bo on the opposite side in the tire circumferential direction CD, but terminating without reaching to the adjacent sipe 13.
The longitudinal sipes 16 exert edge effect with respect to the tire axial direction while maintaining rigidity of the outside block pieces 14A and thereby improve on-ice performance.

According to the present invention, the block pieces 14 include holed block pieces 20 each provided in the ground contacting top surface 14s thereof with at least one small hole 21.

In this embodiment, each of the outside block pieces 14A of the inside and outside crown blocks 11A and 11B is the holed block piece 20 provided with a plurality of small holes 21, in this example three small holes 21, arranged in the tire axial direction.

The small hole 21 has a round (i.e. circular or oval) cross sectional shape in any plane parallel with the ground contacting top surface 14s as shown in FIGS. 4(a), 4(b), 5(a), 5(b) and 6.

The small holes 21 each have an opening maximum radius L7 of not less than 0.6 mm, preferably not less than 1.0 mm, and not more than 2.0 mm, preferably not more than 1.5 mm at the ground contacting top surface 20s, and
a depth D7 from the opening 21o to the bottom 21b, of 30 to 100% of the groove depth D1 of the main grooves 3.

In each of the holed block pieces 20, a total opening area S7 of the small holes 21 is set in a range of from 2 to 12% of the overall area S8 of the ground contacting top surface 20s of the holed block piece 20.
The small holes 21 can soak a water film on a road surface by their capillary action and scratch the road surface by the edges 21e of the openings 21o to obtain a frictional force and thereby it is possible to improve on-ice performance.
In addition, since the opening maximum radius L7, depth D7, and total opening area S7 of the small holes 21 are limited to the foregoing ranges, the holed block pieces 20 maintain sufficient block rigidity for the heavy duty pneumatic tires used under high pressure and heavy loads.
Therefore, the tire 1 of the present invention can improve on-ice performance while suppressing uneven wear and rubber cracking, to thereby maintain uneven wear resistance and durability.

In this embodiment, the outside block pieces 14A with relatively high block rigidity constitute the holed block pieces 20, whereby it is possible to effectively prevent uneven wear and rubber cracking caused by the small holes 21.

Further, since the plurality of small holes 21 are arranged in the tire axial direction, the small holes 21 can produce a friction force while soaking a water film from a road surface in a wide axial area of the holed block pieces 20.

If the opening maximum radius L7 is less than 0.6 mm, the small holes 21 are likely to be obstructed due to deformation of the blocks when contacting with the ground, and thus may not sufficiently soak a water film on a road surface. On the other hand, if the opening maximum radius L7 exceeds 2.0 mm, the holed block pieces 20 may decrease excessively in rigidity and the small holes may deteriorate in power for soaking a water film.

From the same point of view, the depth D7 of the small hole 21 is preferably set in a range of from 30% to 100% of the groove depth D1 of the main grooves 3.

The total opening area S7 of the small holes 21 is preferably set in a range of from 5% to 10% of the overall area S8 of the ground contacting top surface 20s of the holed block piece 20.
At the ground contacting top surface 20s of the holed block piece 20, when measured normally from the edge 21e of the opening of the small hole 21, a minimum rubber thickness W9 of rubber surrounding each small hole 21 is set in a range of not less than 3 mm but not more than 6 mm, preferably not more than 4 mm. Accordingly, the holed block piece 20 can maintain its rigidity around the small holes and prevent uneven wear and rubber cracking.
If the minimum rubber thickness W9 is less than 3 mm, the holed block pieces 20 may not sufficiently prevent uneven wear and rubber cracking. If the minimum rubber thickness W9 exceeds 6 mm, the small holes 21 may not evenly soak a water film between the holed block pieces 20 and a road surface.

Figure 4A:
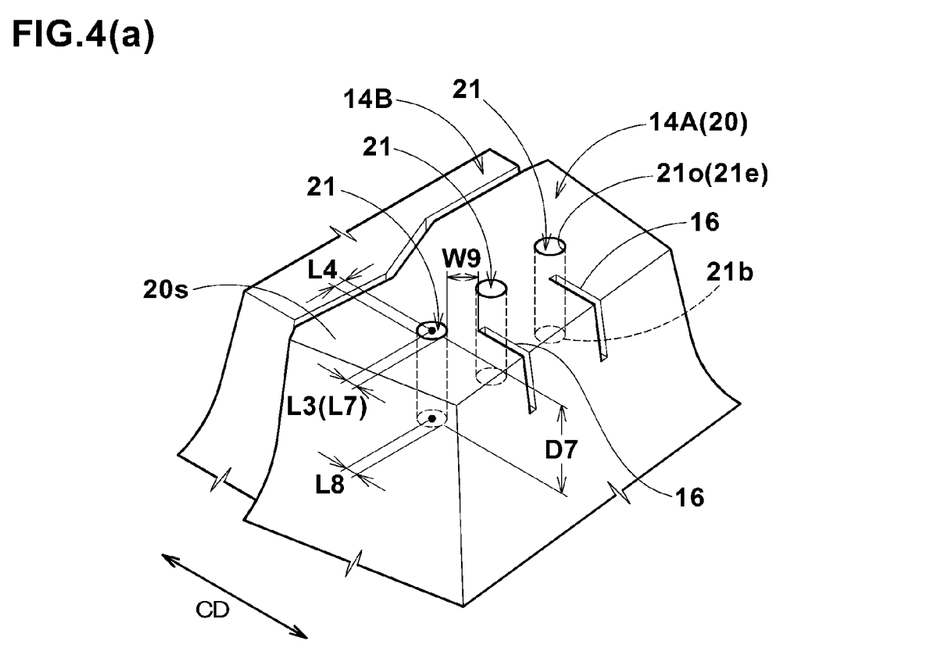
FIG. 4A is a perspective view of a holed block piece.

FIG. 4(a) shows an example of the configuration of the small hole 21, wherein the cross sectional shape of the small hole 21 is a circle whose diameter is constant from the opening 21o to the bottom 21b.

Figure 4B:
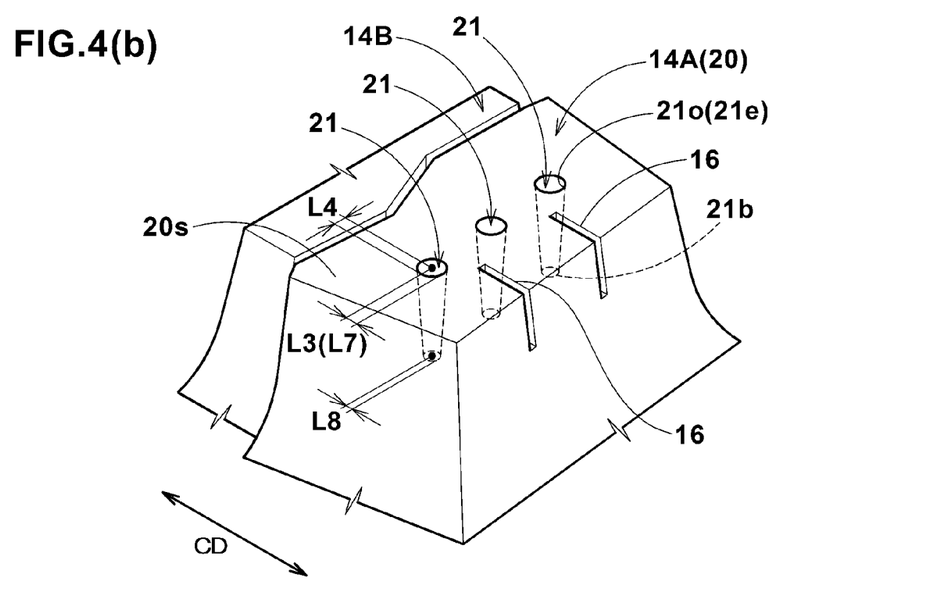
FIGS. 4B, 5A, 5B and 6 are perspective views each showing another example of the holed block piece.

FIG. 4(b) shows an example of the configuration of the small hole 21, wherein the cross sectional shape of the small hole 21 is a circle whose diameter is gradually or continuously decreased from the opening 21o to the bottom 21b to enhance its capillary action and thereby to increase its power to soak a water film and improve on-ice performance. In this example, therefore, the configuration is a truncated cone.
To effectively derive the foregoing action, it is preferred that the small hole 21 has an expansion ratio of not less than 1%, preferably not less than 2%, but not more than 5%, preferably not more than 4%, wherein the expansion ratio=(the opening maximum radius $L7$ in mm−the maximum radius $L8$ in mm at the bottom $21b$)*100/the depth $D7$ in mm of the small hole=$(L7-L8)*100/D7$.

If the expansion ratio is less than 1%, the small hole 21 may not sufficiently exert the foregoing action. If the expansion ratio exceeds 5%, the small hole 21 is excessively decreased in the volume, and thus may not sufficiently soak a water film from a road surface.

Figure 5A:
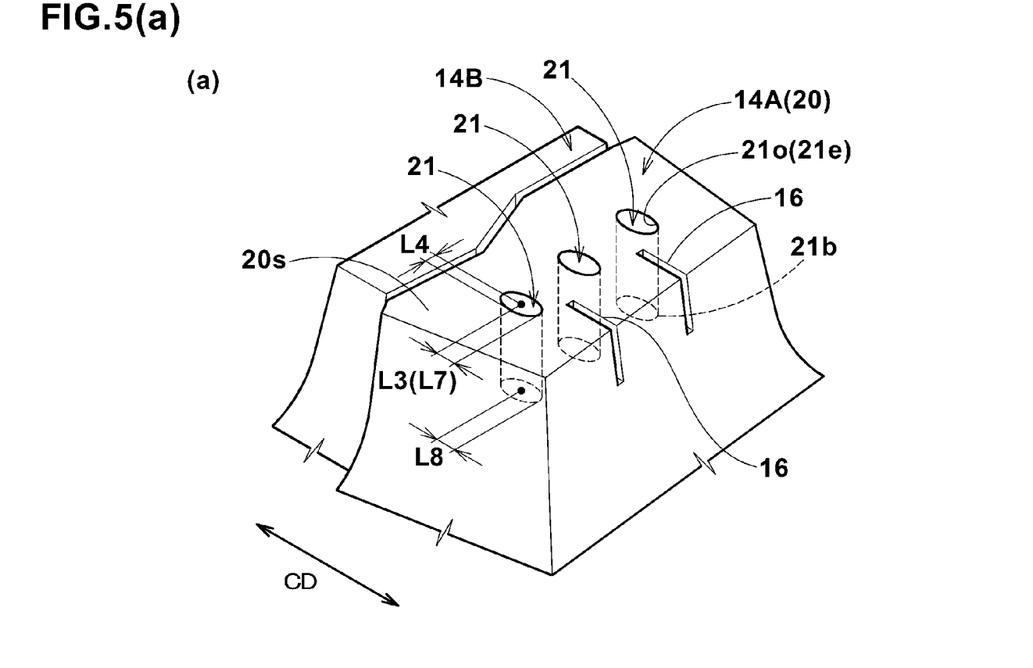

FIG. 5(a) shows an example of the configuration of the small hole 21, wherein the cross sectional shape of the small hole 21 is an oval which is constant from the opening 21o to the bottom 21b with respect to the shape and dimensions. The major axis of the oval is oriented in the tire circumferential direction CD in order that even if the holed block piece 20 is subjected to a large compressive strain in the tire circumferential direction, the opening 21o of the small hole 21 can be prevented from being closed and thereby to maintain the improved on-ice performance.

To effectively derive the foregoing action, the dimension L3 of the opening 210 measured along the major axis is set in a range of not less than 80%, preferably not less than 120%, but not more than 150%, more preferably not more than 140% of the dimension L4 of the opening 210 measured along the minor axis. If the ratio L3/L4 is less than 80%, the small hole 21 may not sufficiently improve the foregoing action. If the ratio L3/L4 exceeds 150%, the small hole 21 may be obstructed in the tire axial direction.

Figure 5B:
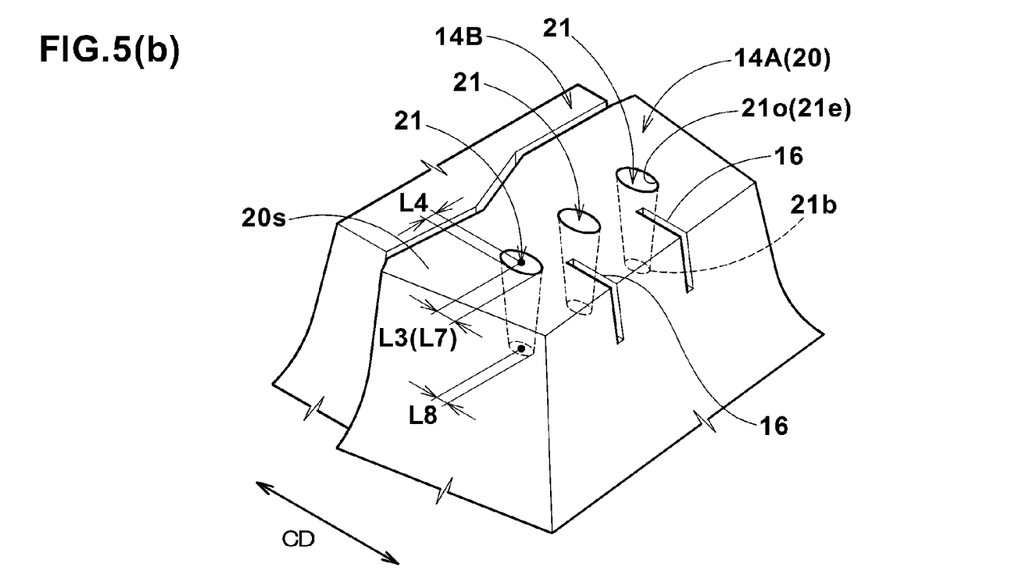

FIG. 5(b) shows an example of the configuration of the small hole 21, wherein the cross sectional shape of the small hole 21 is an oval which gradually or continuously becomes smaller from the opening 210 to the bottom 21b. Such configuration can prevent the closing of the opening 210 and increase the power to soak a water film.

Figure 6:
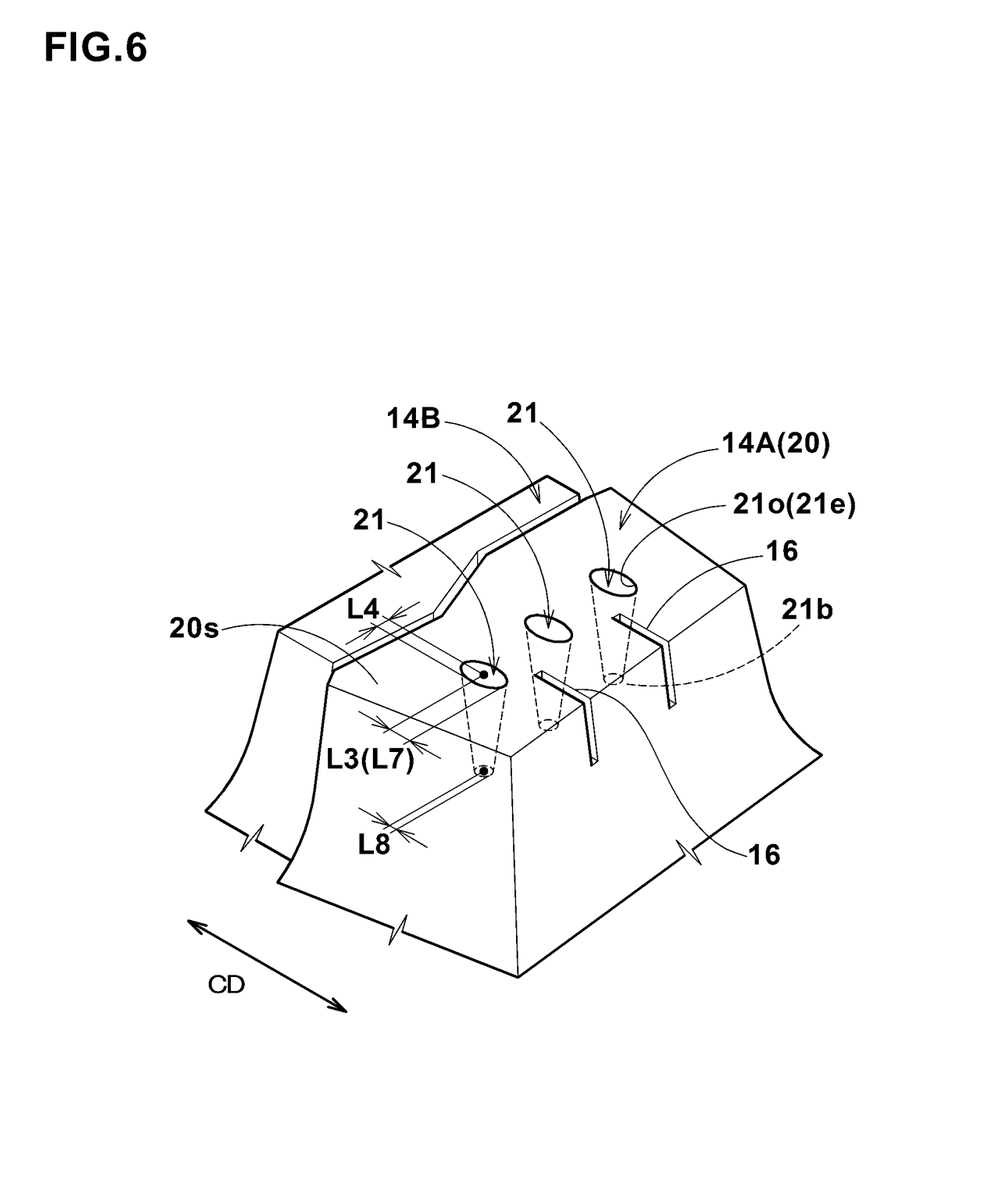

FIG. 6 shows an example of the configuration of the small hole 21, wherein the cross sectional shape of the small hole 21 gradually changes from an oval at the opening 210 to a circle at the bottom 21b as a result of that mainly the length of the major axis is gradually decreased from the opening 210 to the bottom 21b. In this case too, the major axis of the oval is oriented in the tire circumferential direction CD for the same reason as explained above.

As shown in FIG. 1, on each side of the tire equator C, the shoulder blocks 12 in this embodiment include: inside shoulder blocks 12A divided by the inside shoulder lateral grooves 4b1, the shoulder main groove 3B and the inside shoulder sub-groove 7;
middle shoulder blocks 12B divided by the outside shoulder lateral grooves 4b2, the inside shoulder sub-groove 7 and the outside shoulder sub-groove 8; and
outside shoulder blocks 12c divided by the outside shoulder lateral grooves 4b2, the outside shoulder sub-grooves 8 and the tread edge 2e.

The inside shoulder blocks 12A, the middle shoulder blocks 12B and the outside shoulder blocks 12c are not provided with the small holes 21.

Figure 7:
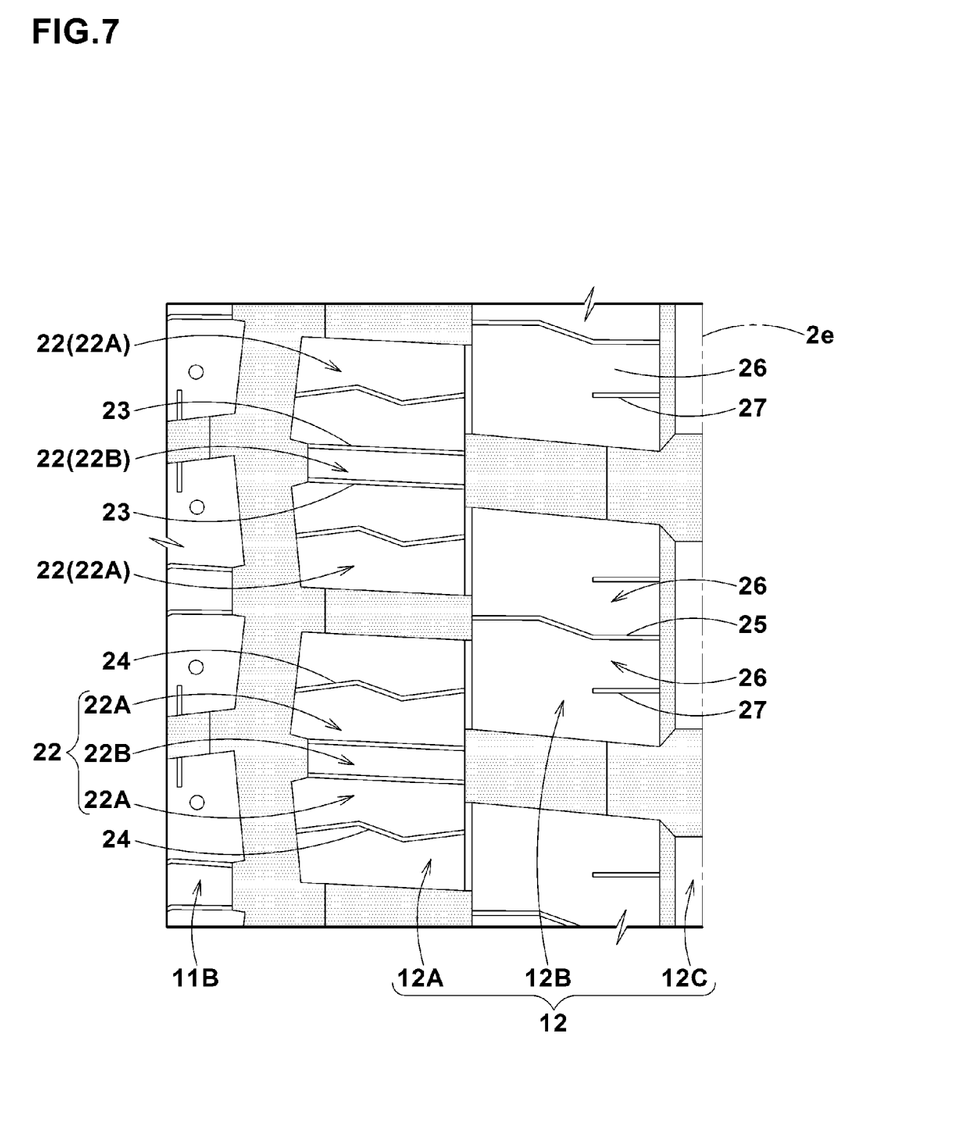
FIG. 7 is an enlarged top view of a shoulder block of the tire shown in FIG. 1.
Figure 8:
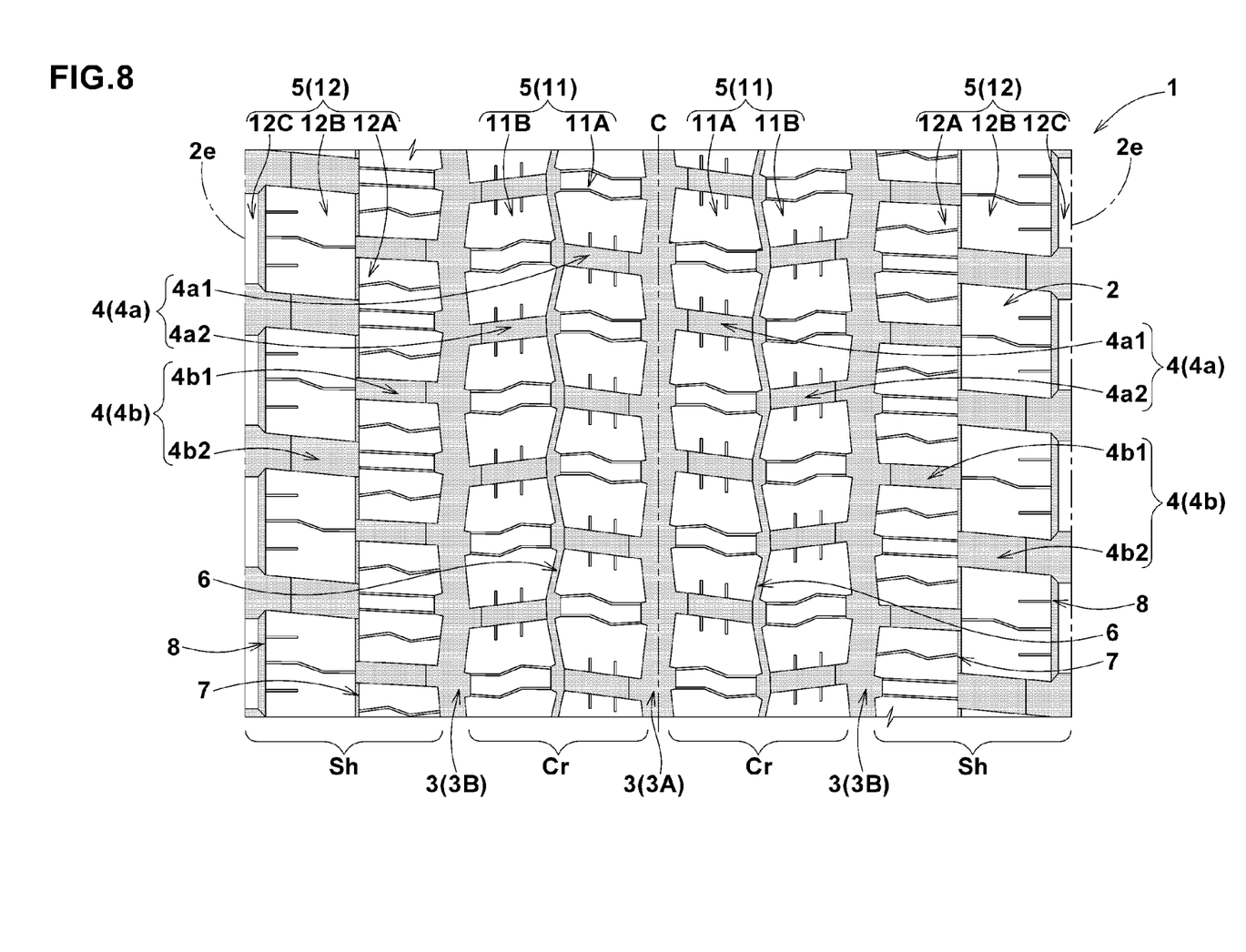
FIG. 8 is a development partial view of a heavy duty pneumatic tire used in the undermentioned comparison test as comparative example Ref. 1.

As shown in FIG. 7, the inside shoulder blocks 12A are each divided into three block pieces 22 by two sipes 23 extending straight in parallel with the tire axial direction across the entire axial width of the block 12A.

The inside shoulder blocks 12A can deform flexibly when contacting with the ground and the edges scratch the road surface to improve the on-ice performance.

The block pieces 22 include a pair of outside block pieces 22A positioned on both sides in the tire circumferential direction CD, and one inside block piece 22B sandwiched between the outside block pieces 22A.

Each of the outside block pieces 22A is larger in the ground-contacting area than the inside block pieces 22B to increase the rigidity and thereby to prevent the occurrence of uneven wear such as heel-and-toe wear.

Each of the outside block pieces 22A is provided with a lateral sipe 24 extending axially in a zigzag manner to exert edge effect in the axial and circumferential directions on the improvement of on-ice performance.

Each of the middle shoulder blocks 12B is provided with one sipe 25 extending axially in a zigzag manner across the entire axial width of the block 12B to be divided into a pair of block pieces 26.

In order to improve wandering performance, each of the block pieces 26 is provided with a lateral sipe 27 extending axially inwardly from the outside shoulder sub-groove 8 and terminating without reaching to the inside shoulder sub-groove 7.

The outside shoulder blocks 12C are each formed in a rectangular shape longer in the tire circumferential direction CD.

The outside shoulder blocks 12C can make a circumferential edge component larger, thereby improving on-ice and on-snow performance and uneven wear resistance. In addition, the outside shoulder blocks 12C can improve the wandering performance.

Comparative Tests

Based on the block type tread pattern shown in FIG. 1, heavy duty pneumatic tires were manufactured and tested for on-ice performance, uneven wear resistance and durability. All of the tires had the same structure except for specifications of the small holes shown in Table 1. Specifications common to all of the tires are as follows:
Tire size: 11R 22.5 14PR (rim size: 22.5×17.50)
Tread width Tw: 242 mm
Center Main Groove and Shoulder Main Grooves:
    Groove width W1: 8.2 mm (3.4% of Tw)
    Groove depth D1: 20.6 mm (8.5% of Tw)
Crown Lateral Grooves and Shoulder Lateral Grooves:
    Groove width W3: 6.0 mm (2.5% of Tw)
    Groove depth D3: 14.5 mm (6.0% of Tw)
Block Pieces:
    Maximum length L5$m$ of outside block pieces: 14.6 mm
    Maximum length L6$m$ of inside block pieces: 9.3 mm
        L5$m$/L6$m$: 156%
    Ground contacting top surface area S8 of holed block pieces: 300 sq·mm <On-Ice Performance Test>

The test tires were mounted on the wheel rims described above, inflated to 800 kPa, and then attached to all of six wheels of a 2-D wheel type 10 ton truck. The truck was driven on a mirror-liked icy road at −5 degrees c, and the test driver evaluated the tires as to whether the starting and accelerating on the icy road were ease or not. The test results are shown in Table 1 by an index based on comparative example tire Ref. 1 being 100, wherein the larger the value, the better the performance.

<Uneven Wear Resistance Test>

The test car was run on a dry asphalt road for 30,000 km, and then the difference between the amount of wear of the outside block pieces and the amount of wear of the inside block pieces was obtained for the inside crown blocks and the outside crown blocks. The measurements of wear were made at three circumferential positions and the average thereof was calculated. The results are shown in Table 1 by an index based on comparative example tire Ref. 1 being 100, wherein the larger the value, the better the uneven wear resistance.

<Durability Test>

By the use of the truck, the tire was run until 50% depth of the main grooves has worn away and then the tire was visually checked for the presence or absence of rubber cracking in the tire blocks. The average number of rubber cracks per a tire is shown in Table 1, wherein the smaller the number, the better the durability.

As shown in Table 1, it was confirmed that the on-ice performance can be improved without sacrificing the uneven wear resistance and the durability.

TABLE 1

| Tire | Ref. 1 | Ref. 2 | Ex. 1 | Ex. 2 | Ref. 3 | Ref. 4 | Ex. 3 | Ex. 4 | Ex. 5 | Ex. 6 | Ref. 5 | Ex. 7 |
|---|---|---|---|---|---|---|---|---|---|---|---|---|
| small hole (Fig. No.) | 8 | 4(a) | 4(a) | 4(a) | 4(a) | 4(a) | 4(a) | 4(a) | 4(a) | 4(a) | 4(a) | 4(a) |
| number of small holes per each piece | 0 | 2 | 2 | 2 | 2 | 5 | 5 | 5 | 5 | 5 | 2 | 2 |
| dimension L3 (mm) | — | 0.60 | 1.00 | 2.00 | 2.20 | 1.00 | 1.00 | 1.00 | 1.00 | 1.00 | 0.95 | 1.00 |
| dimension L4 (mm) | — | 0.60 | 1.00 | 2.00 | 2.20 | 1.00 | 1.00 | 1.00 | 1.00 | 1.00 | 0.95 | 1.00 |
| L3/L4 (%) | — | 100.0 | 100.0 | 100.0 | 100.0 | 100.0 | 100.0 | 100.0 | 100.0 | 100.0 | 100.0 | 100.0 |
| depth D7 (mm) | — | 10.3 | 10.3 | 10.3 | 10.3 | 5.2 | 6.2 | 10.3 | 15.5 | 20.6 | 10.3 | 10.3 |
| D7/D1 (%) | — | 50.0 | 50.0 | 50.0 | 50.0 | 25.2 | 30.1 | 50.0 | 75.2 | 100.0 | 50.0 | 50.0 |
| radius L7 (mm) | — | 0.60 | 1.00 | 2.00 | 2.20 | 1.00 | 1.00 | 1.00 | 1.00 | 1.00 | 0.95 | 1.00 |
| radius L8 (mm) | — | 0.60 | 1.00 | 2.00 | 2.20 | 1.00 | 1.00 | 1.00 | 1.00 | 1.00 | 0.95 | 1.00 |
| (L7 − L8)/D7 (%) | — | 0.00 | 0.00 | 0.00 | 0.00 | 0.00 | 0.00 | 0.00 | 0.00 | 0.00 | 0.00 | 0.00 |
| total opening area S7 (sq. mm) | — | 2.26 | 6.30 | 25.10 | 30.40 | 15.70 | 15.70 | 15.70 | 15.70 | 15.70 | 5.70 | 6.30 |
| S7/S8 (%) | — | 0.75 | 2.10 | 8.37 | 10.13 | 5.23 | 5.23 | 5.23 | 5.23 | 5.23 | 1.90 | 2.10 |
| rubber thickness W9 (mm) | — | 5.40 | 5.00 | 4.00 | 5.00 | 3.00 | 5.00 | 5.00 | 5.00 | 5.00 | 3.00 | 5.00 |
| On-ice performance | 100 | 100 | 110 | 110 | 110 | 100 | 105 | 110 | 110 | 110 | 100 | 110 |
| Durability | 0 | 10 | 0 | 0 | 40 | 0 | 0 | 0 | 0 | 0 | 0 | 0 |
| Uneven wear resistance | 100 | 100 | 100 | 100 | 110 | 100 | 100 | 100 | 100 | 100 | 100 | 100 |

| Tire | Ex. 8 | Ref. 6 | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|---|
| small hole (Fig. No.) | 4(a) | 4(a) | 4(a) | 4(b) | 4(b) | 4(b) | 5(a) | 5(a) | 5(a) | 5(b) | 6 |
| number of small holes per each piece | 5 | 10 | 2 | 5 | 5 | 5 | 2 | 2 | 2 | 2 | 2 |
| dimension L3 (mm) | 1.50 | 1.20 | 2.00 | 1.00 | 1.00 | 1.00 | 1.60 | 2.00 | 1.00 | 2.00 | 2.00 |
| dimension L4 (mm) | 1.50 | 1.20 | 2.00 | 1.00 | 1.00 | 1.00 | 2.00 | 1.50 | 1.50 | 1.50 | 1.50 |
| L3/L4 (%) | 100.0 | 100.0 | 100.0 | 100.0 | 100.0 | 100.0 | 80.0 | 133.3 | 66.7 | 133.3 | 133.3 |
| depth D7 (mm) | 10.3 | 10.3 | 10.3 | 10.3 | 10.3 | 10.3 | 10.3 | 10.3 | 10.3 | 10.3 | 10.3 |
| D7/D1 (%) | 50.0 | 50.0 | 50.0 | 50.0 | 50.0 | 50.0 | 50.0 | 50.0 | 50.0 | 50.0 | 50.0 |
| radius L7 (mm) | 1.50 | 1.20 | 2.00 | 1.00 | 1.00 | 1.00 | 2.00 | 2.00 | 1.50 | 2.00 | 2.00 |
| radius L8 (mm) | 1.50 | 1.20 | 2.00 | 0.89 | 0.48 | 0.4 | 2.00 | 2.00 | 1.50 | 1.7 | 1.7 |
| (L7 − L8)/D7 (%) | 0.00 | 0.00 | 0.00 | 1.1 | 5.0 | 5.8 | 0.00 | 0.00 | 0.00 | 2.9 | 2.9 |
| total opening area S7 (sq. mm) | 35.30 | 45.20 | 25.10 | 15.70 | 15.70 | 15.70 | 20.10 | 18.80 | 9.40 | 18.80 | 18.80 |
| S7/S8 (%) | 11.77 | 15.07 | 8.37 | 5.23 | 5.23 | 5.23 | 6.70 | 6.27 | 3.13 | 6.27 | 6.27 |
| rubber thickness W9 (mm) | 3.00 | 3.00 | 6.00 | 5.00 | 5.00 | 5.00 | 4.00 | 5.00 | 5.00 | 5.00 | 5.00 |
| On-ice performance | 110 | 110 | 105 | 110 | 115 | 110 | 110 | 115 | 110 | 120 | 120 |
| Durability | 0 | 40 | 0 | 0 | 0 | 0 | 0 | 0 | 0 | 0 | 0 |
| Uneven wear resistance | 100 | 110 | 100 | 100 | 100 | 100 | 100 | 100 | 100 | 100 | 100 |

The invention claimed is:

1. A heavy duty pneumatic tire comprising:
a tread portion provided with two shoulder main grooves extending in the tire circumferential direction and each having a width in a range of from 5 to 13 mm, shoulder blocks arranged axially outside each of the shoulder main grooves, and crown blocks arranged between the two shoulder main grooves, each of said crown blocks provided with sipes extending axially across the entire width thereof the sipes being two parallel sipes each having a zigzag shape made up of three segments, whereby the crown block is circumferentially subdivided into a pair of outside block pieces and one inside block piece therebetween,
wherein
the outside block pieces are each provided with small holes in a single axial row, while the inside block piece is provided with no hole,
each of the small holes extends radially inwardly from a ground contacting top surface of the holed block piece to its bottom at a depth in a range of from 30 to 100% of a depth of the shoulder main grooves,
a total opening area of said small holes in the ground contacting top surface of each holed block piece is in a range of from 2 to 12% of the overall area of the ground contacting top surface,
said shoulder blocks are a row of axially inside shoulder blocks, a row of axially outside shoulder blocks, and a row of middle shoulder blocks therebetween,
each of the axially inside shoulder blocks is provided in the ground contacting top surface thereof with two sipes extending axially across the entire width thereof so that the axially inside shoulder block is subdivided into a pair of outside block pieces and one inside block piece therebetween, the outside block pieces are each provided with a single zigzag sipe, while the inside block piece is provided with no sipe,
each of the middle shoulder blocks is provided in the ground contacting top surface thereof with a single sipe extending axially across the entire width thereof so that the middle shoulder block is subdivided into a pair of block pieces, and
the inside shoulder blocks, the middle shoulder blocks and the outside shoulder blocks are provided with no holes.

2. The pneumatic tire according to claim 1, wherein
a minimum thickness of rubber surrounding each said small hole occurring when measured normally to the edge of the opening of the small hole in the ground contacting top surface is in a range of from 3 to 6 mm.

3. The pneumatic tire according to claim 2, wherein
the small hole has a cross-sectional area gradually increasing from the bottom towards the ground contacting top surface.

4. The heavy duty pneumatic tire according to 2, wherein
the small holes in each said outside block piece are arranged in a single row in a tire axial direction.

5. The pneumatic tire according to claim 1, wherein
the small hole has a cross-sectional area gradually increasing from the bottom towards the ground contacting top surface.

6. The heavy duty pneumatic tire according to 5, wherein
the small holes in each said outside block piece are arranged in a single row in a tire axial direction.

7. The heavy duty pneumatic tire according to claim 1, wherein
the small holes in each said outside block piece are arranged in a single row in a tire axial direction.

8. The heavy duty pneumatic tire according to claim 1, wherein
said two sipes subdividing each of the axially inside shoulder blocks are straight sipes, and
said single sipe subdividing each of the middle shoulder blocks is a zigzag sipe.

9. The heavy duty pneumatic tire according to claim 8, wherein
lateral grooves circumferentially dividing the shoulder blocks and lateral grooves circumferentially dividing the crown blocks are straight grooves.

10. The heavy duty pneumatic tire according to claim 9, wherein
said crown blocks between the two shoulder main grooves are arranged in four circumferential rows.

11. The heavy duty pneumatic tire according to claim 1, wherein
each of the small holes has a round cross-sectional shape which is smoothly changed from a circular shape at the bottom to an elliptical shape with a circumferentially-extending major axis at the ground contacting top surface.

* * * * *